United States Patent [19]

LaTourette

[11] 4,020,554
[45] May 3, 1977

[54] PORTABLE PUNCH

[76] Inventor: Eugene E. LaTourette, R.D. No. 1, Cambridge Springs, Pa. 16403

[22] Filed: Dec. 30, 1975

[21] Appl. No.: 645,412

[52] U.S. Cl. .................................. 30/358; 30/368
[51] Int. Cl.² ...................................... B26F 1/00
[58] Field of Search ........................... 30/358, 368

[56] References Cited
UNITED STATES PATENTS

| 505,627 | 9/1893 | Low | 30/367 |
| 905,766 | 12/1908 | Torka | 30/358 X |
| 1,500,576 | 7/1924 | Cusi | 30/358 |
| 2,417,638 | 3/1947 | Egowin | 30/366 |
| 2,726,721 | 12/1955 | Segal | 30/358 X |
| 3,777,399 | 12/1973 | Rockel | 30/361 |

Primary Examiner—Al Lawrence Smith
Assistant Examiner—J. T. Zatarga

[57] ABSTRACT

A punch for a codeable card, having spaces arranged in columns and rows, is disclosed. The punch has a base for supporting a card which slides on the base. The slide has an upper part and a lower part with the base secured between them. A slot in the slide enables the operator to select the particular file of spaces on the card. A pointer on the punch enables the operator to move the card through the punch to the particular code of the index on the card, whereby the operator can punch the code he wishes on the card. The punch is highly portable, rugged and dependable and suitable for meter reading, inventory purposes and other applications requiring that the information be coded on key-punch cards.

The device is simple to operate, reliable, requires little maintenance and above all, is an accurate punch. The punch is made in the current design to provide alignment guides for column placing and a mechanism for easy checking.

9 Claims, 8 Drawing Figures

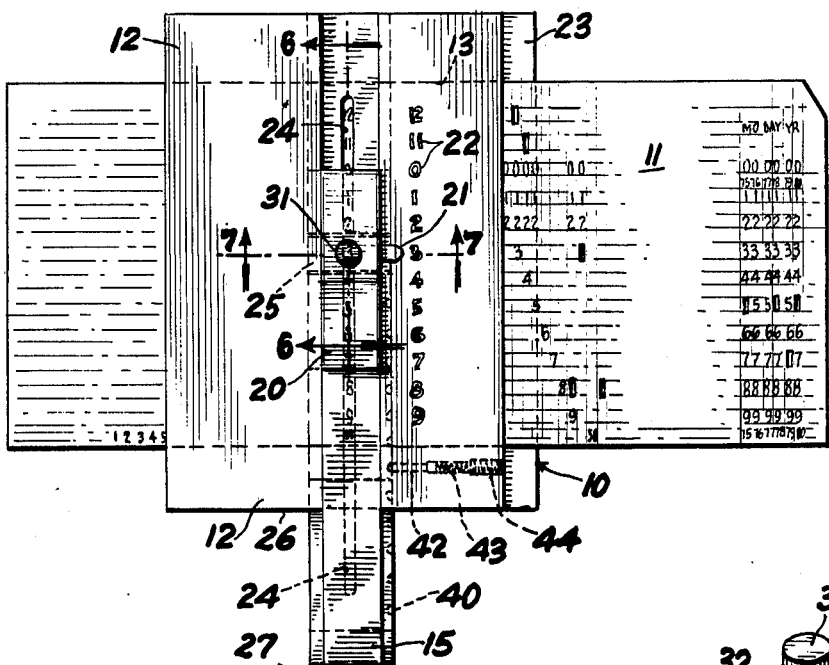
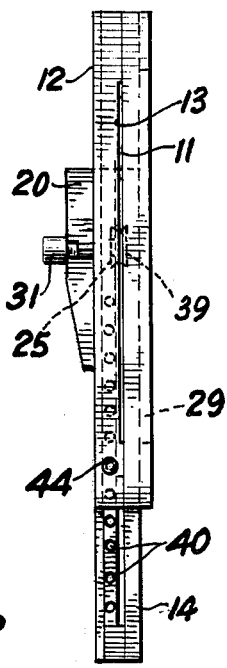
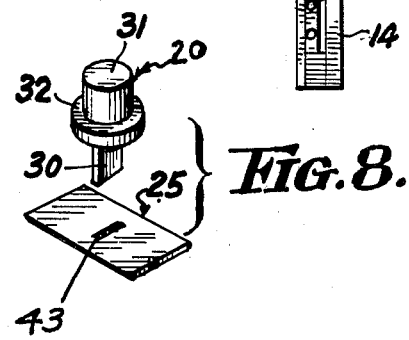
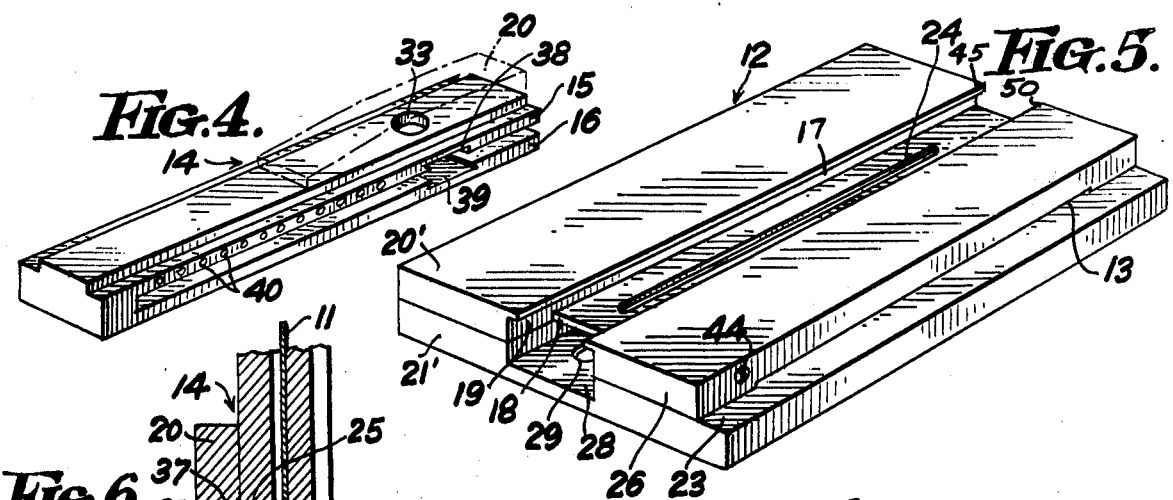
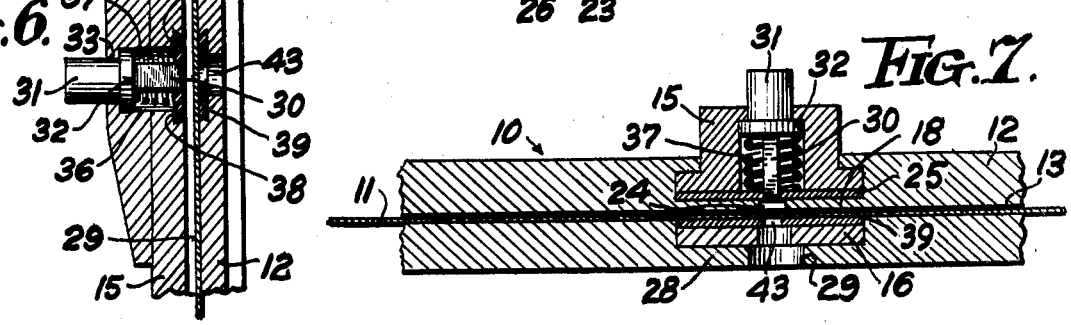

PORTABLE PUNCH

GENERAL DESCRIPTION OF INVENTION

There is a need for a small, rugged, highly portable and dependable hand punch for meter readers, inventory takers and other application requiring an inexpensive piece of equipment with which to perforate data processing cards using Hollerith or other similar codes.

The device must be simple to operate, reliable, require little maintenance and above all, be capable of accurate punch placement. Provision may also be made in the card design to provide alignment guides for column placement and in the mechanism for easy checking manually entered data and alignment of the cards using the guides contained on the cards.

Ideally such a device should be mechanical in nature, small enough to fit into a coat pocket and fairly foolproof to operate.

The device described herein (and variations thereof), is designed to be used on 80 column cards of the type known as IBM cards. This should not be construed to preclude its use on any other type of punched document to which it might be adapted ("short cards" for example).

REFERENCE TO PRIOR ART

The punch disclosed herein is an improvement over U.S. Pat. Nos. 3,186,086; 3,060,782; 2,836,244; 2,726,721; and 1,095,444.

OBJECTS OF THE INVENTION

It is an object of the invention to provide an improved punch for coded cards.

Another object of the invention is to provide a punch for coded cards which is simple in construction, economical to manufacture and simple and efficient to use.

With the above and other objects in view, the present invention consists of the combination and arrangement of parts hereinafter more fully described, illustrated in the accompanying drawing and more particulary pointed out in the appended claims, it being understood that changes may be made in the form, size, porportions and minor details of construction without departing from the spirit or sacrificing any of the advantages of the invention.

GENERAL DESCRIPTION OF DRAWINGS

FIG. 1 is a top view of the punch according to the invention.

FIG. 2 is a side view of the punch.

FIG. 3 is an end view of the punch.

FIG. 4 is an isometric view of the slide for the device.

FIG. 5 is an isometric view of the base of the punch device according to the invention.

FIG. 6 is a cross sectional view of the punch, according to the invention, taken on line 6—6 of FIG. 1.

FIG. 7 is a longitudinal cross sectional view of the punch according to the invention, taken on line 7—7 of FIG. 1.

FIG. 8 is an isometric exploded view of the punch and die parts.

DETAILED DESCRIPTION OF DRAWINGS

Now with more particular reference to the drawings, a punching device, according to the invention, is indicated generally at 10 with card 11 supported in slot 13. The punch device has a base 12 which contains a channel 28 extending through it perpendicular to slot 13 for receiving a slide 14. The slide 14 Channel 28 is divided into upper and lower portions by web 18 has an upper part 15 and a lower part 16 which are disposed around the web 18. The upper part 15 of the slide 14 is received in the T-shaped upper portion of channel 28 17 above the web 18. The lower part 16 of the slide 14 is received in the lower portion 19 below the web 18 of the channel 28. The upper part 15 of the slide 14 is relieved along its upper edges providing shoulders on which flanges 45 and 50 rest, the card 11 will normally extend over the shoulder 23 of the base and over the lower part 16 of the slide so that the columns of indicia on the card can be viewed through the slot 24 in the web 18. The rows on indicia on the card will align with the indicia 22 on the upper base part 20'. Thus, by aligning the card 11 to the proper column by looking through the slot 24, and moving the slide 14 to the proper row by aligning the pointer 21 to the indicia 22, the punching device will be properly aligned.

The upper die on blade 30 is fixed to the upper slide part 15 and a lower die part or anvil plate 39 is fixed to the lower slide part 16. The upper die part and the handle 31 are indicated with their parts received in a counterbore 33 in the upper slide part 15.

The punching device has a base 12 made up of an upper base part 20' and a lower base part 21' with the slot 13 between them. The upper base part 20' has an upper T-shaped portion 17 of channel 28 which receives the upper leg 15 of slide 14. The bottom of T-shaped upper portion 17 is formed by web 18 which is integral with the upper part of the base. The web 18 terminates adjacent the end 26 of the base 20' providing a space for the end 27 of the slide 14 where the upper leg 15 and lower leg 16 are integrally connected together. Below the web 18 a lower portion 19 of the channel 28 is formed. The lower portion 19 extends from the end to end of the base 12 and receives the lower leg 16 of the slide 14. Thus, the slide upper leg 15 slides above the web 18 in the T-shaped upper portion 17 and the lower leg 16 slides through the lower portion 19 channel 28 in the base 12.

The web 18 has a longitudinal slot 24 which extends parallel to the channel 28. A slot 29 is formed in the bottom 28 of the lower portion 19. The slot 29 is parallel to and underlies the slots 24.

It will be noted in FIG. 2 that the card 11 slides across the top of the lower base 21 part through the slot 13 and under the web 18 and under the upper leg 15 of the slide 14.

It will also be seen that the punching mechanism 20 is supported on the slide 14. The upper part 15 of the slide 14 at a widened section 20 contains a steel punch blade 30 that has a flat bore and is inclined as shown in FIG. 6. This part 30 being a steel part is fixed to the handle 31. The handle 31 has a flange 32 that is received in the hole 33 in the slide 14. A plate 25 is received in the upper dovetail slot 28 in the upper leg 15 of the slide 14 and this supports the spring 37 which urges the handle upward against the flange 36 of the counterboard hole 33 the plate 25 has an opening 47 for the blade 30. To remove the punch, it is merely necessary to remove the slide 14, slide the plate 35 out of its dovetail notch, thus allowing the punch to be removed. The lower plate 39 is likewise received in a dovetail slot 35 in the lower leg 16. The plate 39 has a central opening 48 the same shape as the point of the punch blade 30. The upper leg 15 has spaced detent openings 40 in it and a detent ball 41 is received in the bore 42 in the upper base part 20'. A spring 43 in the bore urges the ball 41 into engagement with the proper detent 40. The spring 43 is held in place by a set screw 44. The punch handle 31 has a pointer 31 on it and this pointer points to the number in the rows of indicia on the top of the base corresponding to the number on the row of indicia 22 that the punch blade 30 will penetrate at that point.

To use the device, the operator inserts a card 11 in the slot 13 and views the columns of indicia through the slot 24.

The operator pushes the card 11 to bring it to the proper column, then he moves the slide to bring the pointer 21 to the desired number on the card. He then forces the handle 31 downward and the blade 30 punches out the desired numeral from the row and column of indicia on the card and pushes this numeral through the opening 48 in the punch anvil or plate 39. The spring 37 will then push the handle 31 back up to its original position, ready for punching another hole.

The foregoing specification sets forth the invention in its preferred practical forms but the structure shown is capable of modification within a range of equivalents without departing from the invention which is to be understood is broadly novel as is commensurate with the appended claims.

I claim:

1. A punching device for cards of the type having rows of indicia disposed in columns on said cards, said punching device having,
   a base having a transverse slot therethrough providing a card supporting means and having a longitudinal groove traversing said slot with an intermediately disposed web traversing said groove and spaced from the bottom thereof and fixed to the sides defining said groove,
   a slide supported on said base,
   means on said base guiding said slide to move in a direction parallel to said columns,
   a punch supported on said slide,
   die means on said slide to receive said punch for punching out said indicia at selected positions in said rows and in said columns on said card,
   means on said base for holding said slide at the selected position relative to said card,
   said slide has an upper leg and a lower leg disposed parallel to each other and define a space therebetween,
   said space receiving said card and said web,
   said web having a longitudinal slot therein parallel to said legs of said slide for viewing the said columns of said indicia on a card supported in said card supporting means.

2. The punching device recited in claim 1 wherein said means on said base for guiding said slide comprises,
   a T shaped portion of said groove above said web,
   said slide being made up of said upper leg and said lower leg connected together at one end thereof,
   said upper leg being slidably received in said T shaped portion of said groove,
   and, said lower leg of said slide being received in the portion of the groove beneath said web,
   said punch being supported on said supper leg and said die means being supported on said lower leg.

3. The punching device recited in claim 2 wherein said base has a bottom part extending parallel to said web closing the bottom part of said groove and a slot disposed in said bottom part of said base parallel to said groove.

4. The punching device recited in claim 4 wherein said web has its slot therein registering with a slot in said slide, whereby the columns on said card can be viewed from above said punch.

5. The punching device recited in claim 2 wherein said base comprises an upper plate like base part and a lower plate like base part forming a plate like member,
   said upper plate like base part has said T shaped portion therein,
   and, said lower plate like base part has an upwardly facing slot forming a lower portion of said groove,
   said lower plate like base part being a relatively flat member having said lower portion of said groove extending approximately half-way from the top to the bottom of said lower plate like part.

6. The punching device recited in claim 2 wherein said base has a row of indicia threron parallel to said T-shaped portion and disposed adjacent thereto,
   the indicia members in said row of indicia each correspond to a said row of indicia on said card,
   the punch having a pointer thereon adapted to selectively point the the each of said indicia member in said row corresponding to the row of indicia in said column underlying said punch member.

7. The punching device recited in claim 6 wherein a detent member is supported on said base at a side of said T-shaped portion,
   and said slide has spaced notches therein corresponding to each said column on said card,
   said notches in said slide adapted to be engaged by said detent member to locate said punching member in the said row of said indicia on said card to be punched out by said punch in the position indicated.

8. The punching device recited in claim 1 wherein said space for receiving said card is provided between said web and the upper side of said lower leg of said slide.

9. The punching device recited in claim 8 wherein said base has a shoulder having a top surface flush with the top surface of said lower leg of said slide whereby said card may be rested on said shoulder and inserted into said punching device above said lower leg of said slide.

* * * * *